(12) United States Patent
Hong et al.

(10) Patent No.: US 7,940,450 B2
(45) Date of Patent: May 10, 2011

(54) ELECTRO-OPTIC DISPLAY APPARATUS

(75) Inventors: Sung-Jin Hong, Seoul (KR); Hae-Il Park, Seoul (KR); Jae-Byung Park, Seongnam-si (KR); Seon-Tae Yoon, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 79 days.

(21) Appl. No.: 12/466,908

(22) Filed: May 15, 2009

(65) Prior Publication Data

US 2010/0085629 A1    Apr. 8, 2010

(30) Foreign Application Priority Data

Oct. 8, 2008  (KR) .................................. 2008-98645

(51) Int. Cl.
*G02B 26/00* (2006.01)
*G09G 3/34* (2006.01)

(52) U.S. Cl. ......... 359/296; 359/452; 345/107; 204/450

(58) Field of Classification Search .................. 359/296; 345/107; 427/58, 164, 256; 349/122; 430/7, 430/48

See application file for complete search history.

(56) References Cited

U.S. PATENT DOCUMENTS

| 5,582,700 | A | | 12/1996 | Bryning et al. | |
|---|---|---|---|---|---|
| 6,117,368 | A | * | 9/2000 | Hou | 252/572 |
| 7,247,341 | B2 | * | 7/2007 | Abe et al. | 427/64 |
| 7,852,548 | B2 | * | 12/2010 | Roh | 359/296 |
| 2010/0033802 | A1 | * | 2/2010 | Roh | 359/296 |
| 2010/0085299 | A1 | * | 4/2010 | Yoon et al. | 345/107 |

FOREIGN PATENT DOCUMENTS

| JP | 09120087 | 5/1997 |
|---|---|---|
| JP | 2002099003 | 4/2002 |
| JP | 2008107740 | 5/2008 |
| KR | 1020060106816 | 10/2006 |

\* cited by examiner

*Primary Examiner* — Loha Ben
(74) *Attorney, Agent, or Firm* — H.C. Park & Associates, PLC (57) ABSTRACT

An electro-optic display apparatus includes a first electrode, a second electrode, an electro-optic material, and an insulating layer. The second electrode faces the first electrode to form an electric field in cooperation with the first electrode. The electro-optic material is disposed between the first and second electrodes. The insulating layer is arranged on a surface of at least one of the first electrode and the second electrode and contacts the electro-optic material. The electro-optic material includes a non-polar solvent forming a continuous phase, and a polar solvent dispersed in the non-polar solvent to form a droplet controlled by the electric field.

16 Claims, 5 Drawing Sheets

ELECTRO-OPTIC DISPLAY APPARATUS

CROSS REFERENCE TO RELATED APPLICATION

This application claims priority from and the benefit of Korean Patent Application No. 2008-98645, filed on Oct. 8, 2008, which is hereby incorporated by reference for all purposes as if fully set forth herein.

BACKGROUND OF THE INVENTION

1. Field of the Invention

The present invention relates to an electro-optic display apparatus capable of improving display quality.

2. Discussion of the Background

As various electronic appliances such as mobile phones, computers, televisions, and Personal Digital Assistants (PDAs) have been developed, demand for a flat panel display apparatus applicable to the electronic appliances has increased. Recently, e-paper capable of substituting for real paper has been the subject of steadily increasing attention.

E-paper may be obtained by using electrophoresis that may provide a high contrast ratio and have no dependency on viewing angles.

Flat panel display apparatuses using electrophoresis include Reverse Emulsion Electrophoretic Display (REED) apparatuses developed by Zikon Corporation (U.S. Pat. No. 5,582,700). The REED technology realizes an image by interposing electro-optic material of a non-polar continuous phase and a polar dispersed phase between an upper transparent electrode and a lower transparent electrode, and applying a voltage to the upper and lower transparent electrodes. When the voltage is applied across the electrodes, the polar phase electro-optic material may migrate to the electrode having an opposite charge from that of the polar phase. Depending on the migration of the polar phase electro-optic material in the display apparatus, various viewable portions of the display apparatus may appear light or dark, thereby displaying an image.

In REED apparatuses, the electro-optic material may have a low resistance, so stored charges may be rapidly discharged. Thus, the voltage applied to the electro-optic material to display images may not be maintained for a long period of time.

SUMMARY OF THE INVENTION

The present invention provides an electro-optic display apparatus that may increase a holding time of a voltage applied to electro-optic material.

The present invention also provides an electro-optic apparatus wherein a voltage applied to an electro-optic material may be maintained for a long period of time by arranging an insulating layer between the electro-optic material and an electrode. Accordingly, a grayscale image may be displayed by the electro-optic apparatus even if the voltage is not continuously applied to the electrode.

Additional features of the invention will be set forth in the description which follows, and in part will be apparent from the description, or may be learned by practice of the invention.

The present invention discloses an electro-optic display apparatus including a first electrode, a second electrode, electro-optic material, and an insulating layer. The second electrode faces the first electrode to form an electric field in cooperation with the first electrode. The electro-optic material is disposed between the first and second electrodes. The insulating layer is arranged on a surface of at least one of the first electrode and the second electrode and contacts the electro-optic material. The electro-optic material includes a non-polar solvent forming a continuous phase, and a polar solvent dispersed in the non-polar solvent to form a droplet controlled by the electric field.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, show exemplary embodiments of the invention, and together with the description serve to explain the principles of the invention.

DETAILED DESCRIPTION OF THE ILLUSTRATED EMBODIMENTS

The invention is described more fully hereinafter with reference to the accompanying drawings, in which exemplary embodiments of the invention are shown. This invention may, however, be embodied in many different forms and should not be construed as limited to the exemplary embodiments set forth herein. Rather, these exemplary embodiments are provided so that this disclosure is thorough, and will fully convey the scope of the invention to those skilled in the art. In the drawings, the size and relative sizes of layers and regions may be exaggerated for clarity. Like reference numerals in the drawings denote like elements.

It will be understood that when an element or layer is referred to as being "on" or "connected to" another element or layer, it can be directly on or directly connected to the other element or layer, or intervening elements or layers may be present. In contrast, when an element is referred to as being "directly on" or "directly connected to" another element or layer, there are no intervening elements or layers present.

As used herein, the terms 'continuous phase' and 'dispersed phase' are related to a dispersion system which is a material system including a first material forming a homogeneous phase and a second material dispersed in the first material in the form of fine particles. In such a dispersion system, the term 'continuous phase', which is opposed to the term 'dispersed phase', means a first phase surrounding a second phase dispersed in the system having two phases mixed therein and present continuously. The term 'dispersed phase' means the second phase dispersed in the continuous phase.

Additionally, the term 'emulsion' refers to a heterogeneous system including a continuous phase and a dispersed phase capable of forming droplets in the continuous phase.

The continuous phase or the dispersed phase may be in a solid, liquid, or gas phase, as desired. Hereinafter, for the sake of convenience, an exemplary embodiment of the present invention will be described with reference to a liquid phase. However, the scope of the present invention is not limited thereto.

Figure 1:
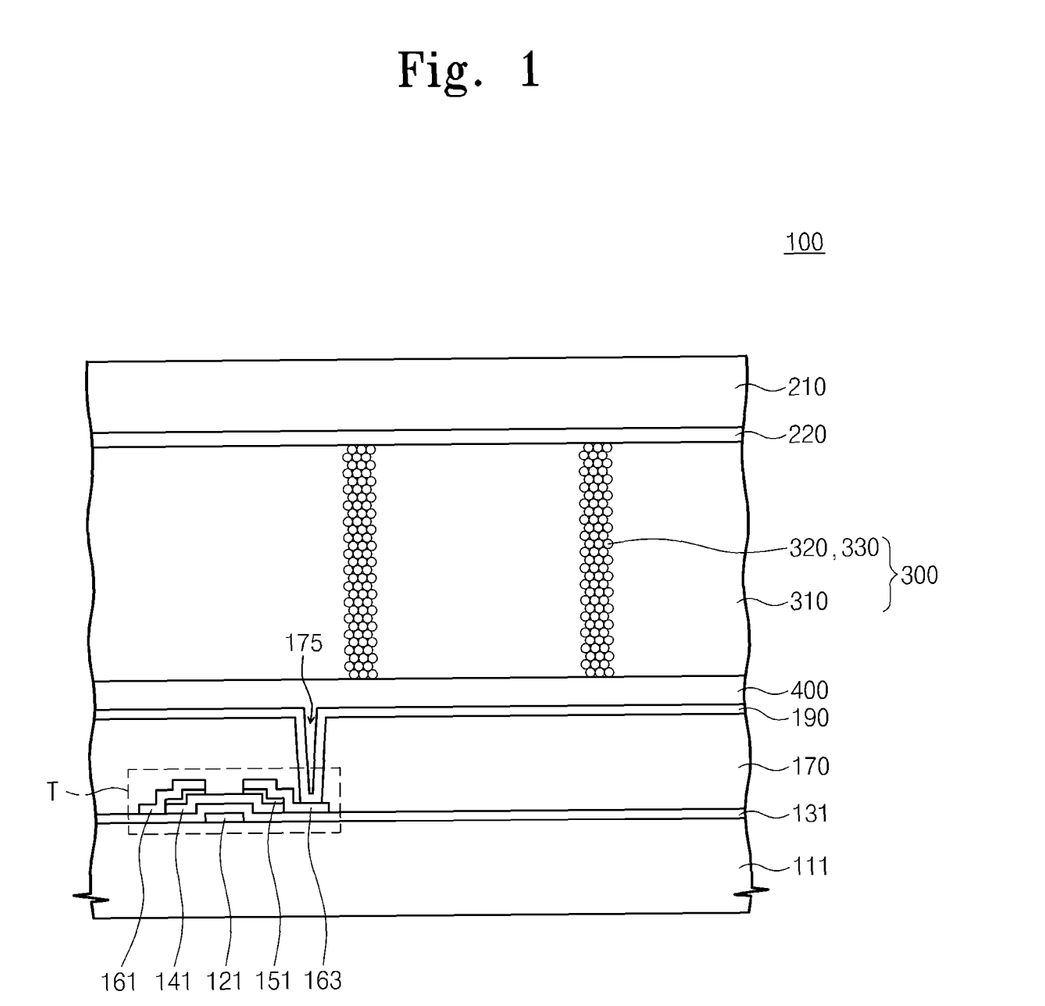
FIG. 1 is a sectional view showing an electro-optic display apparatus according to a first exemplary embodiment of the present invention.

FIG. 1 is a sectional view showing an electro-optic display apparatus according to a first exemplary embodiment of the present invention.

As shown in FIG. 1, the electro-optic display apparatus 100 includes a first substrate 111 on which a first electrode 190 is disposed, a second substrate 210 on which a second electrode 220 facing the first electrode 190 is disposed, an electro-optic material 300 interposed between the first and second substrates 111 and 210, and a first electrode insulating layer 400 disposed between the first electrode 190 and the electro-optic material 300.

The first substrate 111 includes a plurality of gate lines (not shown) extending in parallel to each other in a first direction and a plurality of data lines (not shown) extending in parallel to each other. The data lines are disposed substantially perpendicular to and cross the gate lines. Hereinafter, for the sake of convenience, the description of the gate lines and data lines will be made with reference to one gate line and one data line.

A thin film transistor T is formed in an area defined by where the gate line crosses the data line. The thin film transistor T includes a gate electrode 121, a gate insulating layer 131, an active layer 141, an ohmic contact layer 151, a source electrode 161, and a drain electrode 163.

The gate electrode 121 branches from the gate line and is electrically connected to the gate line. The gate insulating layer 131 may include silicon nitride ($SiN_x$), silicon oxide ($SiO_x$), etc., to insulate the gate electrode 121 from other conductors. The active layer 141 is formed on the gate insulating layer 131 using amorphous silicon while overlapping the gate electrode 121. The ohmic contact layer 151 is formed on the active layer 141 using amorphous silicon doped with impurities. The source electrode 161 is connected to the data line and is disposed on the gate insulating layer 131 and the ohmic contact layer 151. The drain electrode 163 is disposed on the gate insulating layer 131 and the ohmic contact layer 151 while being spaced apart from the source electrode 161. The thin film transistor T is protected from electric impact and physical impact by a protective layer 170.

The protective layer 170 is formed on the gate insulating layer 131, the active layer 141, the source electrode 161, and the drain electrode 163 for the purpose of insulation and planarization. The protective layer 170 may include one of inorganic material and organic material to improve insulating characteristics and off characteristics of the thin film transistor T. Alternatively, the protective layer 170 may include a lower layer made of inorganic material and an upper layer made of organic material. The protective layer 170 includes a contact hole 175 that exposes a part of the drain electrode 163.

The first electrode 190 is disposed on the protective layer 170. The first electrode 190 is connected to the drain electrode 163 of the thin film transistor T through the contact hole 175. The first electrode 190 includes conductive material, capable of reflecting light, such as aluminum (Al), chrome (Cr), etc. Alternatively, the first electrode 190 may include a transparent conductive material such as Indium Tin Oxide (ITO), Indium Zinc Oxide (IZO), etc.

The second substrate 210 is disposed above the first substrate 111 and opposite to the first substrate 111. The second electrode 220 is disposed on the second substrate 210 and faces the first electrode 190.

When a voltage is applied to the second electrode 220, the second electrode 220 generates an electric field in cooperation with the first electrode 190. The second electrode 220 includes transparent conductive material such as ITO, IZO, etc.

The electro-optic material 300 includes a non-polar solvent 310 and a polar solvent 320 and is disposed between the first and second electrodes 190 and 220.

The non-polar solvent 310 forms a continuous phase of the electro-optic material 300. The non-polar solvent 310 may be colorless or colored. In the present exemplary embodiment, the non-polar solvent 310 is substantially colorless. The non-polar solvent 310 includes at least one of $C_{1-30}$ alkanes, $C_{2-30}$ alkenes, $C_{3-30}$ alkynes, $C_{3-30}$ aldehydes, $C_{3-30}$ ketones, $C_{2-30}$ ethers, $C_{2-30}$ esters, $C_{3-30}$ thioesters, terpenes, $C_{2-30}$ organosilanes, $C_{2-30}$ organosiloxanes, aromatic compounds, and combinations thereof. In addition, the non-polar solvent 310 includes at least one aromatic compound of benzene, toluene, and tetralin.

The polar solvent 320 forms a non-continuous phase of the electro-optic material 300 and is dispersed in the non-polar solvent 310 in the form of a droplet. FIG. 1 represents the polar solvent 320 when an electric field is formed between the first electrode 190 and the second electrode 220. As shown in FIG. 1, the polar solvent 320 according to the present exemplary embodiment is provided in the form of a plurality of droplets regularly connected to each other. However, the present invention is not limited to the arrangement of polar solvent as shown in FIG. 1.

The polar solvent 320 includes at least one of alcohol, amine, amide, ketone, carboxylic acid, carboxylic acid salt, glycol, polyether, sulfide, sulfonic acid, sulfonic acid salt, sulfate, phosphide, phosphite, phosphonite, phosphinite, phosphate, phosphonate, phosphinate, imide, nitrile, isonitrile, amidine, nitro compound, nitroso compound, sulfoxide, sulfonate, thiol, water, and combinations thereof.

In addition, the polar solvent 320 includes at least one of dimethyl sulfoxide (DMSO), dimethyl formamide (DMF), methanol, ethanol, glycol, nitromethane, acetonitrile, methoxyethanol, methyl cellosolve, monoethyl ether, and combinations thereof.

The polar solvent 320 includes dye 330 that is not soluble in the non-polar solvent 310 but is soluble in the polar solvent 320. That is, the dye 330 is dissolved in the polar solvent 320. The polar solvent 320 expresses a color by using the dye 330.

The dye 330 includes at least one of monazo dyes, diazo dyes, triphenylmethane dyes, pyrazolone dyes, acridines, porphyrine, diformazan dyes, squarain dyes, oxazines, formazan dyes, colored metals and transition metal complexes, metal salts, acid anthraquinone dyes, amphoteric anthraquinone dyes, diphenylmethane dyes, polymethine dyes, thiazines, phthalocyanines, tetrazolium dyes, and mixtures thereof.

If an electric field is not formed between the first electrode 190 and the second electrode 220, the polar solvent 320 is homogeneously dispersed in the non-polar solvent 310 and is distributed over the whole inside of the non-polar solvent 310. Accordingly, the electro-optic display apparatus 100 has a color obtained by combining the polar solvent 320, the dye 330, and the non-polar solvent 310.

The electro-optic material 300 further includes a surfactant (not shown) that lowers the surface tension of an interfacial surface generated between the non-polar solvent 310 and the polar solvent 320. The polar solvent 320 forming a dispersed phase is more easily dispersed in the non-polar solvent 310 forming a continuous phase because of the surfactant.

The polar solvent 320 including the dye 330 and the surfactant form a reverse micelle in the continuous phase of the non-polar solvent 310. The reverse micelle has a configuration in which the polar solvent 320 is surrounded by the surfactant in the continuous phase of the non-polar solvent 310. The surfactant allows the polar solvent 320 to be easily dispersed in the non-polar solvent 310. Accordingly, the electro-optic material 300 has an opaque property as a whole due to the dispersed polar solvent 320.

The polar solvent 320 may be charged negatively or positively. The polar solvent 320 is arranged according to the direction of the electric field. For example, if the electric field is formed between the first electrode 190 and the second electrode 220, the polar solvent 320 provided in the form of the droplet is charged with a positive polarity and moves toward one of the first and second electrodes 190 and 220 charged with a negative polarity. The polar solvent 320, which has been dispersed in the non-polar solvent 310, gathers together so that the polar solvent 320 is arranged in the form of droplets elongated in a direction perpendicular to the first and second electrodes 190 and 220.

The distribution of the polar solvent 320 depends on variables including a distance between the first electrode 190 and the second electrode 220, voltage intensity, voltage offset, voltage frequency, etc.

The first electrode insulating layer 400 is disposed on the first electrode 190. The first electrode insulating layer 400 insulates the first electrode 190. The first electrode insulating layer 400 includes transparent insulating material so that light introduced from the outside passes through the first electrode insulating layer 400. The first electrode insulating layer 400 includes at least one transparent insulating material selected from silicon nitride ($SiN_x$), silicon oxide ($SiO_x$), polyvinyl pyrrolidone, polyimide, polysiloxane resin, and polyacrylate resin. Alternatively, the first electrode insulating layer 400 may include material capable of reflecting light. For example, the first electrode insulating layer 400 may include titanium oxide ($TiO_x$) capable of reflecting light.

Alternatively, the first electrode insulating layer 400 may be disposed between the second electrode 220 and the electro-optic material 300. In this case, the first electrode insulating layer 400 insulates the second electrode 220 from the electro-optic material 300.

Figure 2:
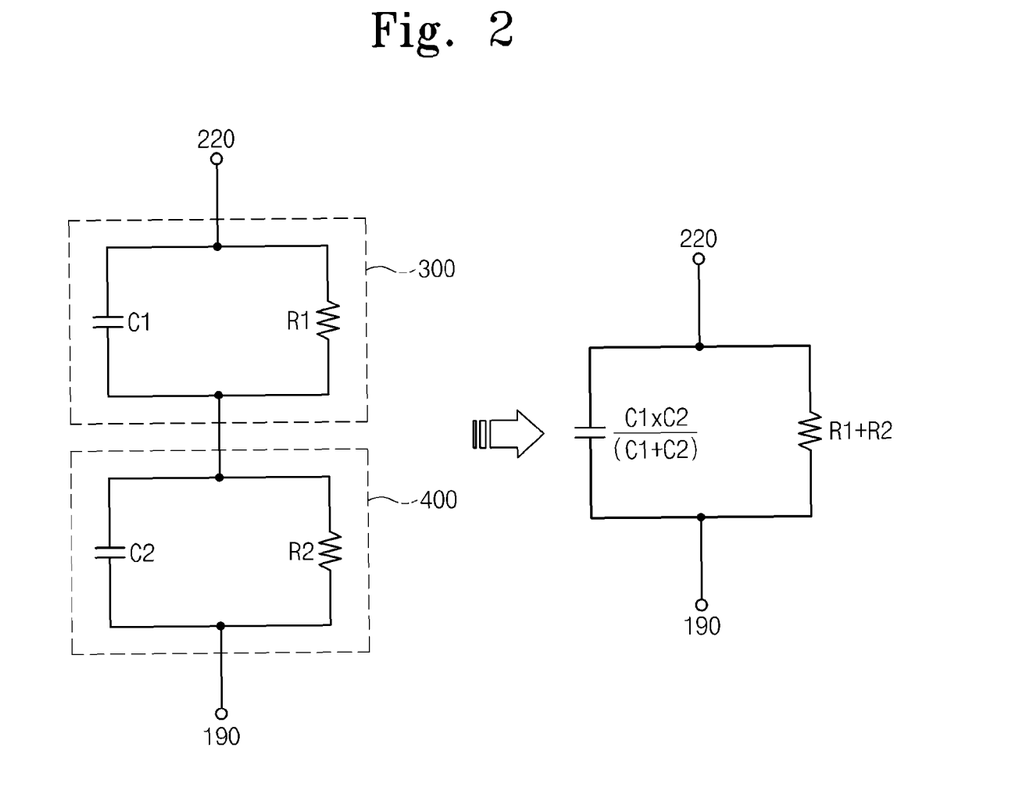
FIG. 2 is an equivalent circuit diagram showing a first electrode, a second electrode, an electro-optic material, and a first electrode insulating layer shown in FIG. 1.

FIG. 2 is an equivalent circuit diagram showing the first electrode, the second electrode, the electro-optic material, and the first electrode insulating layer shown in FIG. 1.

Referring to FIG. 2, the electro-optic material 300 and the first electrode insulating layer 400 are disposed between the first and second electrodes 190 and 220.

The electro-optic material 300 includes the non-polar solvent and the polar solvent, which is charged and dispersed in the non-polar solvent. The electro-optic material 300 includes a first capacitance component C1 and a first resistance component R1 in terms of the electrical aspect.

The first electrode insulating layer 400 includes insulating material and is disposed between the first electrode 190 and the electro-optic material 300. The first electrode insulating layer 400 includes a second capacitance component C2 and a second resistance component R2 in terms of the electrical aspect.

When a voltage is applied to the first and second electrodes 190 and 220, the electro-optic material 300 and the first electrode insulating layer 400 are charged by the electric field formed between the first and second electrodes 190 and 220. In addition, the electric charges in the electro-optic material 300 and the first electrode insulating layer 400 are slowly discharged by the first and second resistance components R1 and R2.

If the electro-optic material 300 and the first electrode insulating layer 400 are formed between the first and second electrodes 190 and 220, resistance of the electro-optic display apparatus increases as compared with when only the electro-optic material 300 is formed between the first and second electrodes 190 and 220. For example, as shown in FIG. 2, the quantity of electric charges in the electro-optic material 300 and the first electrode insulating layer 400 has a value that is obtained by dividing C1×C2 by C1+C2. In addition, the amount of the electric charges discharged to the outside from the electro-optic material 300 and the first electrode insulating layer 400 is reduced due to the sum of R1+R2, in which R1 and R2 represent first and second resistance components, respectively. Even if the voltage is not supplied to the first and second electrodes 190 and 220, the electric charges may be maintained in the electro-optic material 300 for a predetermined time, so that voltage sufficient to drive the polar solvent may be maintained.

Figure 3:
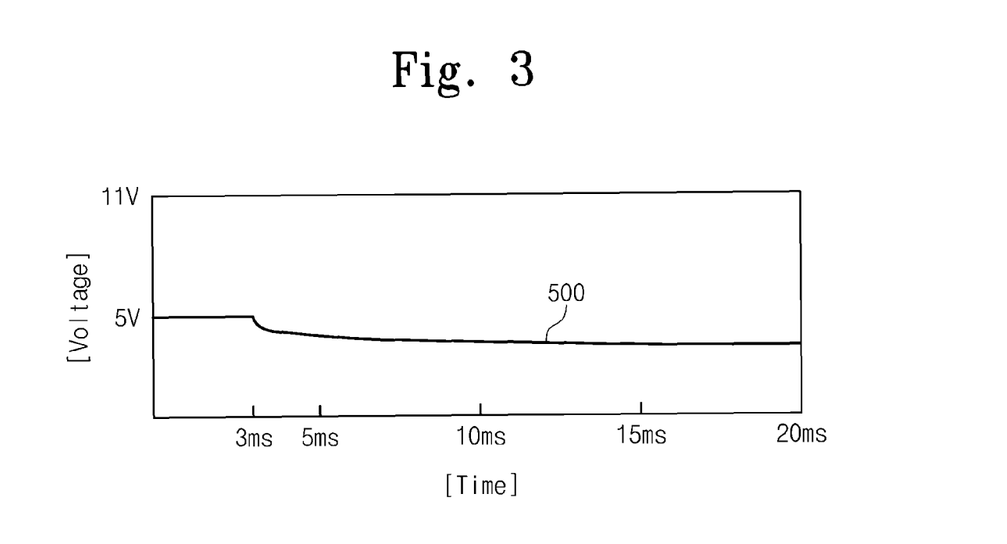
FIG. 3 is a graph representing a voltage applied to the electro-optic display apparatus shown in FIG. 1.

FIG. 3 is a graph representing the voltage applied to the electro-optic display apparatus 100 shown in FIG. 1. In FIG. 3, the vertical axis represents the voltage and the horizontal axis represents the time.

FIG. 3 is a graph including a curve 500 that represents the voltage (hereinafter, referred to as a measured voltage) measured on the electro-optic material 300 in the electro-optic display apparatus including the first electrode insulating layer 400 and the electro-optic material 300 interposed between the first and second electrodes 190 and 220 when about 5V of drive voltage is applied to the electro-optic material for about 3 ms, and then supply of the drive voltage is cut off. The curve 500 of FIG. 3 shows the measured voltage, which is measured for about 20 ms from the point at which the drive voltage is initially applied. Here, about 20 ms corresponds to the time required for a signal provided to display a next image.

The measured voltage may be maintained at a predetermined level or above while the electro-optic display apparatus 100 is displaying one image. If the measured voltage is 0V, the electro-optic material 300 has an opaque property, so that the electro-optic display apparatus 100 may fail to display normal images. According to the present exemplary embodiment, the measured voltage is gradually decreased for about 17 ms from the point of about 3 ms, at which the drive voltage supply is cut off, thereby maintaining a level of about 3V or above.

Accordingly, even if the drive voltage is not continuously applied to the first and second electrodes 190 and 220, the electro-optic display apparatus 100 can maintain the measured voltage at a level that is sufficient to display an image.

Figure 4:
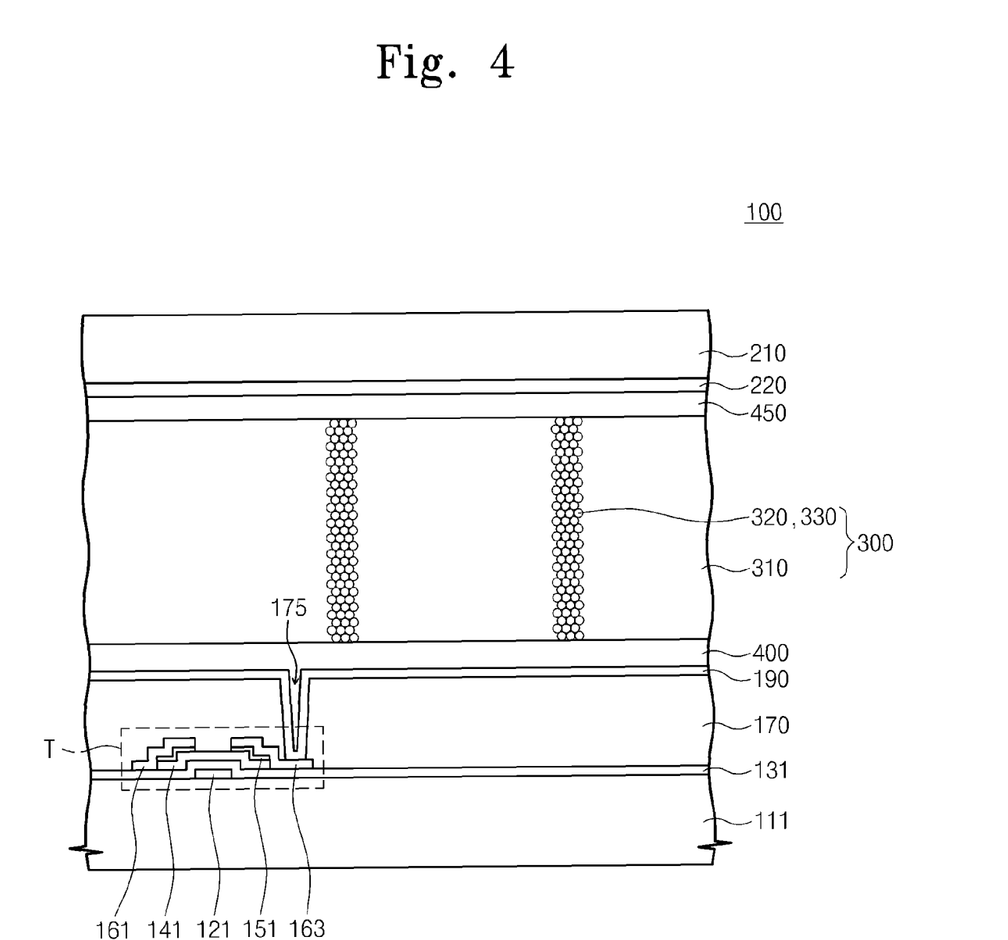
FIG. 4 is a sectional view showing an electro-optic display apparatus according to a second exemplary embodiment of the present invention.

FIG. 4 is a sectional view showing an electro-optic display apparatus according to a second exemplary embodiment of the present invention. In the description below, details of elements identical to those shown in FIG. 1 will be omitted in order to avoid redundancy.

Referring to FIG. 4, the electro-optic display apparatus 100 includes the first substrate 111 on which the first electrode 190 is disposed, the second substrate 210 on which the second electrode 220 facing the first electrode 190 is disposed, the electro-optic material 300 interposed between the first and second substrates 111 and 210, the first electrode insulating layer 400 disposed between the first electrode 190 and the electro-optic material 300, and a second electrode insulating layer 450 disposed between the second electrode 220 and the electro-optic material 300.

The second electrode insulating layer 450 insulates the second electrode 220 from other conductive components. The second electrode insulating layer 450 includes transparent insulating material so that light introduced from the outside passes through the second electrode insulating layer 450. The second electrode insulating layer 450 includes at least one transparent insulating material selected from silicon nitride ($SiN_x$), silicon oxide ($SiO_x$), polyvinyl pyrrolidone, polyimide, polysiloxane resin, and polyacrylate resin.

Figure 5:
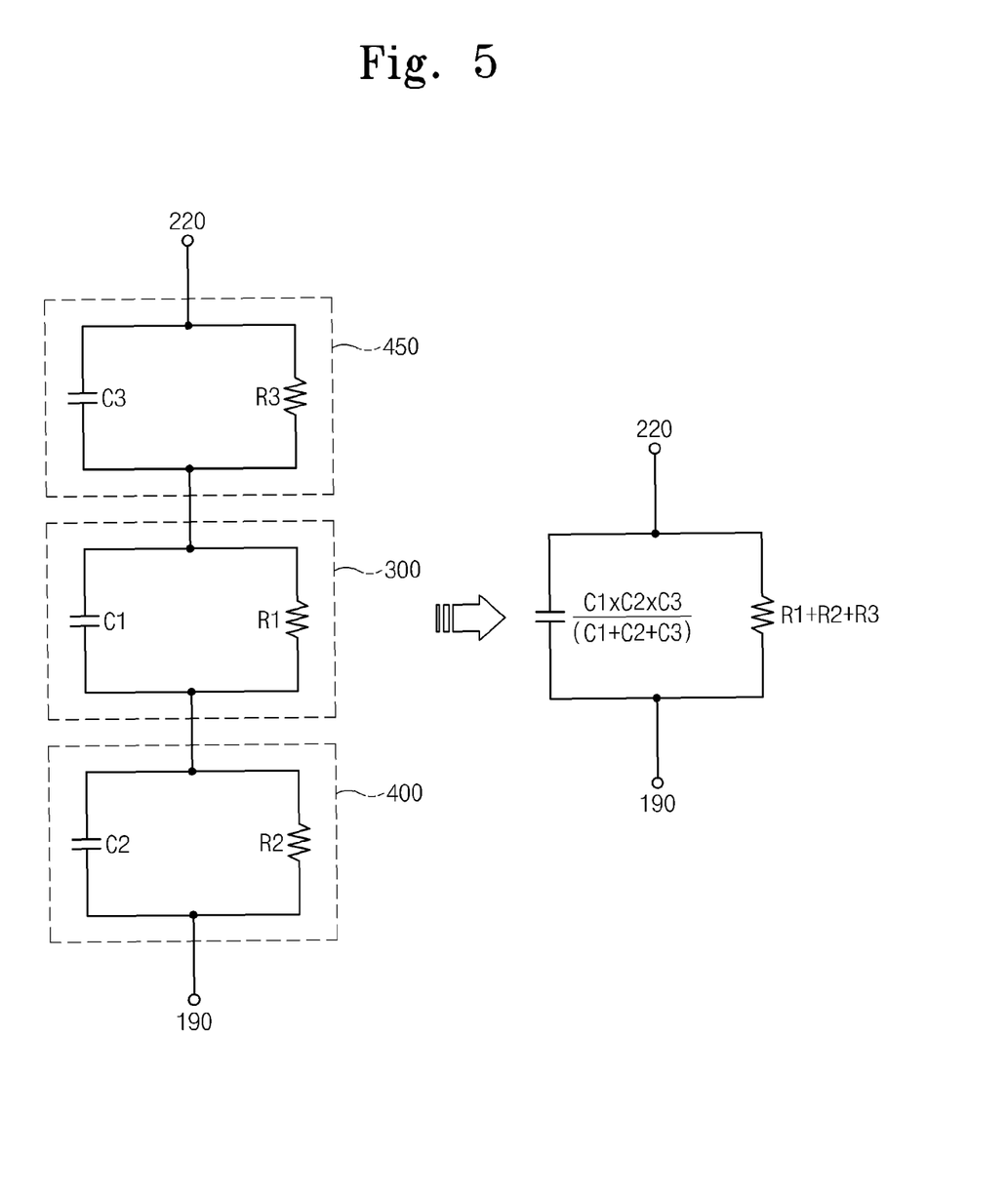
FIG. 5 is an equivalent circuit diagram showing a first electrode, a second electrode, an electro-optic material, a first electrode insulating layer, and a second electrode insulating layer shown in FIG. 4.

FIG. 5 is an equivalent circuit diagram showing the first electrode, the second electrode, the electro-optic material, the first electrode insulating layer, and the second electrode insulating layer shown in FIG. 4.

Referring to FIG. 5, the electro-optic material 300, the first electrode insulating layer 400 and the second electrode insulating layer 450 are disposed between the first and second electrodes 190 and 220.

The electro-optic material 300 includes the non-polar solvent and the polar solvent charged and dispersed in the non-polar solvent. The electro-optic material 300 includes the first capacitance component C1 and the first resistance component R1 in terms of the electrical aspect.

The first electrode insulating layer 400 includes insulating material and is disposed between the first electrode 190 and the electro-optic material 300. The first electrode insulating layer 400 includes the second capacitance component C2 and the second resistance component R2 in terms of the electrical aspect.

The second electrode insulating layer 450 includes insulating material and is disposed between the second electrode 220 and the electro-optic material 300. The second electrode insulating layer 450 includes a third capacitance component C3 and a third resistance component R3 in terms of the electrical aspect.

The electro-optic material 300, the first electrode insulating layer 400, and the second electrode insulating layer 450 are charged by the electric field formed between the first and second electrodes 190 and 220 when a voltage is applied to the first and second electrodes 190 and 220. The electric charges are slowly discharged from the electro-optic material 300, the first electrode insulating layer 400, and the second electrode insulating layer 450 due to the first, second, and third resistance components R1, R2, and R3, respectively.

Figure 6:
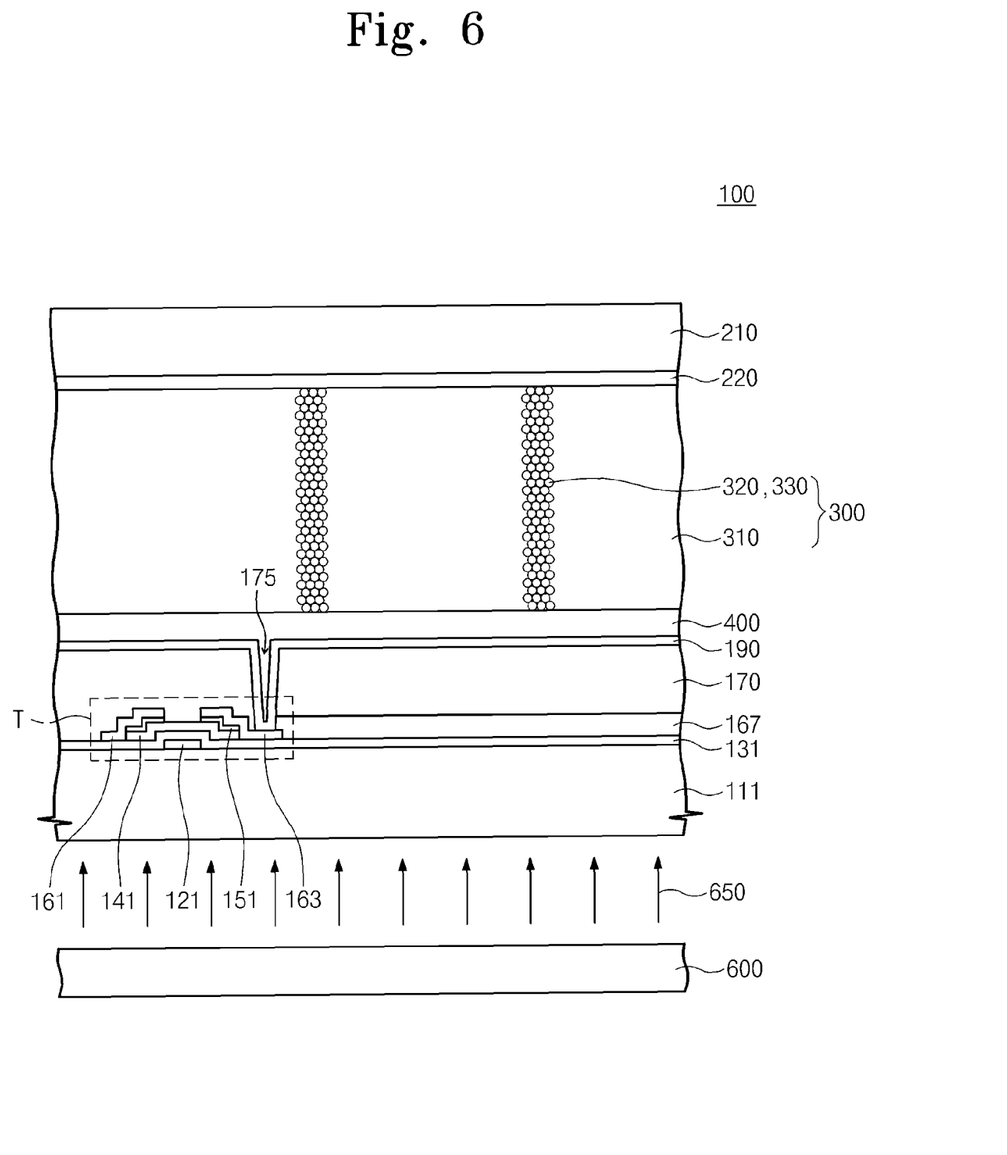
FIG. 6 is a sectional view showing an electro-optic display apparatus according to a third exemplary embodiment of the present invention.

For example, as shown in FIG. 5, the quantity of electric charges in the electro-optic material 300 and the first and second electrode insulating layers 400 and 450 has a value that is obtained by dividing C1×C2×C3 by C1+C2+C3. In addition, the amount of the electric charges discharged to the outside from the electro-optic material 300, and the first and second electrode insulating layers 400 and 450 is reduced due to the sum of R1+R2+R3. Even if the voltage is not supplied to the first and second electrodes 190 and 220, the electric charges may be maintained in the electro-optic material 300 for a predetermined time, so that voltage sufficient to drive the polar solvent may be maintained FIG. 6 is a sectional view showing an electro-optic display apparatus according to a third exemplary embodiment of the present invention. In the description below, details of elements identical to those shown in FIG. 1 will be omitted in order to avoid redundancy.

Referring to FIG. 6, the electro-optic display apparatus 100 includes the first substrate 111 on which the first electrode 190 is disposed, the second substrate 210 on which the second electrode 220 facing the first electrode 190 is disposed, the electro-optic material 300 interposed between the first and second substrates 111 and 210, the first electrode insulating layer 400 disposed between the first electrode 190 and the electro-optic material 300, and a backlight unit 600 disposed below the first substrate 111.

The first electrode 190 includes transparent conductive material that allows light to pass therethrough. For example, the first electrode 190 includes transparent conductive material such as ITO, IZO, etc.

The electro-optic display apparatus 100 further includes a color filter layer 167, which is disposed on the first substrate 111 and is located below the first electrode 190.

The color filter layer 167 is disposed in the form of a Colorfilter On Array (COA) on the first substrate 111. The color filter layer 167 is disposed on a portion of the first substrate 111 except for a specific area in which the thin film transistor T is formed. The color filter layer 167 includes dye having one of red, green, and blue colors so that light 650 introduced from the backlight unit 600 can express the color.

The backlight unit 600 receives electric power from the outside to generate light 650. The backlight unit 600 provides the light 650 to the first substrate 111. The backlight unit 600 may include a lamp, a light emitting diode, etc.

The electro-optic display apparatus 100 allows the light 650 provided from the backlight unit 600 to pass through the color filter layer 167, the first electrode 190, the first electrode insulating layer 400, the electro-optic material 300, and the second substrate 210, thereby expressing grayscale.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:

1. An electro-optic display apparatus, comprising:
a first electrode;
a second electrode facing the first electrode, the second electrode to form an electric field in cooperation with the first electrode;
an electro-optic material disposed between the first electrode and the second electrode, the electro-optic material comprising a non-polar solvent, the non-polar solvent to form a continuous phase, and a polar solvent dispersed in the non-polar solvent, the polar solvent to form a droplet controlled by the electric field; and
an insulating layer arranged on a surface of at least one of the first electrode and the second electrode, the insulating layer contacting the electro-optic material.

2. The electro-optic display apparatus of claim 1, wherein the polar solvent comprises a dye soluble in the polar solvent.

3. The electro-optic display apparatus of claim 2, wherein the polar solvent is charged with electricity.

4. The electro-optic display apparatus of claim 2, wherein the dye comprises at least one selected from the group consisting of monazo dyes, diazo dyes, triphenylmethane dyes, pyrazolone dyes, acridines, porphyrine, diformazan dyes, squarain dyes, oxazines, formazan dyes, colored metals and transition metal complexes, metal salts, acid anthraquinone dyes, amphoteric anthraquinone dyes, diphenylmethane dyes, polymethine dyes, thiazines, phthalocyanines, tetrazolium dyes, and combinations thereof.

5. The electro-optic display apparatus of claim 1, wherein the insulating layer comprises a transparent insulating material comprising at least one selected from the group consisting of silicon nitride ($SiN_x$), silicon oxide ($SiO_x$), polyvinyl pyrrolidone, polyimide, polysiloxane resin, and polyacrylate resin.

6. The electro-optic display apparatus of claim 1, wherein the insulating layer comprises titanium oxide ($TiO_x$) capable of reflecting light.

7. The electro-optic display apparatus of claim 1, wherein one of the first electrode and the second electrode, which is disposed at a relatively lower location, comprises a conductive material capable of reflecting light.

8. The electro-optic display apparatus of claim 1, wherein the non-polar solvent comprises at least one selected from the group consisting of $C_{1-30}$ alkanes, $C_{2-30}$ alkenes, $C_{3-30}$ alkynes, $C_{3-30}$ aldehydes, $C_{3-30}$ ketones, $C_{2-30}$ ethers, $C_{2-30}$ esters, $C_{3-30}$ thioesters, terpenes, $C_{2-30}$ organosilanes, $C_{2-30}$ organosiloxanes, aromatic compounds, and combinations thereof.

9. The electro-optic display apparatus of claim 8, wherein the non-polar solvent comprises at least one aromatic compound selected from the group consisting of benzene, toluene, and tetralin.

10. The electro-optic display apparatus of claim 1, wherein the polar solvent comprises at least one selected from the group consisting of alcohol, amine, amide, ketone, carboxylic acid, carboxylic acid salt, glycol, polyether, sulfide, sulfonic acid, sulfonic acid salt, sulfate, phosphide, phosphite, phosphonite, phosphinite, phosphate, phosphonate, phosphinate, imide, nitrile, isonitrile, amidine, nitro compound, nitroso compound, sulfoxide, sulfonate, thiol, water, and combinations thereof.

11. The electro-optic display apparatus of claim 1, wherein the polar solvent comprises at least one selected from the group consisting of dimethyl sulfoxide (DMSO), dimethyl formamide (DMF), methanol, ethanol, glycol, nitromethane, acetonitrile, methoxyethanol, methyl cellosolve, monoethyl ether, and combinations thereof.

12. The electro-optic display apparatus of claim 1, wherein the electro-optic material further comprises a surfactant to lower a surface tension generated between the non-polar solvent and the polar solvent.

13. The electro-optic display apparatus of claim 1, further comprising a first substrate and a second substrate on which the first electrode and the second electrode are disposed, respectively.

14. The electro-optic display apparatus of claim 13, further comprising a thin film transistor arranged on the first substrate, the thin film transistor connected to the first electrode, and the thin film transistor to provide a voltage.

15. The electro-optic display apparatus of claim 13, further comprising a color filter arranged on the first substrate and overlapping the first electrode.

16. The electro-optic display apparatus of claim 1, further comprising a backlight unit to generate a light, the backlight unit to supply the light to the electro-optic material.

* * * * *